United States Patent
Mu et al.

(10) Patent No.: US 10,484,214 B2
(45) Date of Patent: *Nov. 19, 2019

(54) TECHNIQUE FOR CROSSTALK REDUCTION

(71) Applicant: TELEFONAKTIEBOLAGET LM ERICSSON (PUBL), Stockholm (SE)

(72) Inventors: Fenghao Mu, Hjärup (SE); Lars Sundström, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,002

(22) Filed: Feb. 8, 2018

(65) Prior Publication Data

US 2018/0183634 A1  Jun. 28, 2018

Related U.S. Application Data

(63) Continuation of application No. 15/334,970, filed on Oct. 26, 2016, now Pat. No. 9,893,913, which is a
(Continued)

(30) Foreign Application Priority Data

Nov. 30, 2011 (EP) .................................. 11009463

(51) Int. Cl.
| | | |
|---|---|---|
| *H04L 25/08* | (2006.01) | |
| *H04B 15/04* | (2006.01) | |
| *H04B 3/32* | (2006.01) | |

(52) U.S. Cl.
CPC .............. *H04L 25/08* (2013.01); *H04B 3/32* (2013.01); *H04B 15/04* (2013.01)

(58) Field of Classification Search
CPC ............ H04L 25/08; H04B 3/32; H04B 15/04
See application file for complete search history.

(56) References Cited

U.S. PATENT DOCUMENTS

| 4,688,003 A | 8/1987 | Stromswold |
|---|---|---|
| 5,311,546 A | 5/1994 | Paik et al. |

(Continued)

FOREIGN PATENT DOCUMENTS

| CN | 1283335 | 2/2001 |
|---|---|---|
| EP | 1248378 | 10/2002 |

(Continued)

OTHER PUBLICATIONS

Office Action dated Apr. 14, 2015, issued in Chinese Patent Application No. 201280059431.4, 5 pages.
(Continued)

*Primary Examiner* — Kenneth T Lam
(74) *Attorney, Agent, or Firm* — Rothwell, Figg, Ernst & Manbeck, P.C.

(57) ABSTRACT

A technique for cancelling or reducing crosstalk signals between controlled oscillators in an integrated circuit is provided. The technique involves an arrangement adapted to reduce a crosstalk signal generated by a first controlled oscillator to a second oscillator both comprised in the integrated circuit, wherein both controlled oscillators are configured to output a respective clock signal. The arrangement comprises a detector adapted to detect the crosstalk signal generated by the first controlled oscillator to the second controlled oscillator, a crosstalk cancellation circuit adapted to generate a cancellation signal having an amplitude substantially the same as that of the crosstalk signal and a phase substantially opposite to that of the crosstalk signal, and a cancellation signal injector adapted to introduce the cancellation signal into the second controlled oscillator.

8 Claims, 8 Drawing Sheets

Related U.S. Application Data continuation of application No. 14/361,929, filed as application No. PCT/EP2012/073331 on Nov. 22, 2012, now Pat. No. 9,614,702.

(60) Provisional application No. 61/569,521, filed on Dec. 12, 2011.

(56) References Cited

U.S. PATENT DOCUMENTS

| | | | |
|---|---|---|---|
| 5,541,959 A | | 7/1996 | Myers |
| 5,717,730 A | | 2/1998 | Prakash et al. |
| 5,847,612 A | * | 12/1998 | Birleson ............... H03D 7/161 |
| | | | 331/2 |
| 6,314,145 B1 | | 11/2001 | van Driest |
| 6,587,521 B1 | | 7/2003 | Matui |
| 6,985,705 B2 | | 1/2006 | Shohara |
| 7,372,337 B2 | | 5/2008 | Nayler |
| 7,405,628 B2 | | 7/2008 | Hulfachor et al. |
| 7,551,677 B2 | | 6/2009 | Crawford |
| 8,031,019 B2 | | 10/2011 | Chawla et al. |
| 8,093,943 B2 | | 1/2012 | Arai |
| 8,154,329 B2 | | 4/2012 | Ecklund et al. |
| 8,198,930 B2 | | 6/2012 | Zerbe et al. |
| 8,212,611 B2 | | 7/2012 | Akhtar |
| 8,222,939 B2 | | 7/2012 | Takinami et al. |
| 8,229,372 B2 | | 7/2012 | Hoyerby et al. |
| 8,339,208 B2 | | 12/2012 | Luong et al. |
| 8,384,452 B1 | | 2/2013 | Parker et al. |
| 9,007,131 B2 | | 4/2015 | Mirzaei et al. |
| 9,257,999 B1 | | 2/2016 | Vilhonen |
| 9,397,673 B2 | | 7/2016 | Nilsson |
| 9,407,274 B2 | | 8/2016 | Laaja |
| 9,614,702 B2 | * | 4/2017 | Mu ........................ H04B 15/04 |
| 9,893,913 B2 | * | 2/2018 | Mu ........................ H04B 15/04 |
| 2002/0105389 A1 | | 8/2002 | Nishimura et al. |
| 2003/0078022 A1 | | 4/2003 | Cai |
| 2003/0125006 A1 | | 7/2003 | Miya |
| 2004/0119514 A1 | | 6/2004 | Karlquist |
| 2004/0120418 A1 | | 6/2004 | Pasternak et al. |
| 2004/0166815 A1 | | 8/2004 | Maligeorgos |
| 2004/0189361 A1 | | 9/2004 | Jung |
| 2005/0186920 A1 | | 8/2005 | Staszewski et al. |
| 2006/0103566 A1 | | 5/2006 | Vemulapalli et al. |
| 2006/0202767 A1 | | 9/2006 | Nayler |
| 2007/0026816 A1 | | 2/2007 | Heidari et al. |
| 2007/0194811 A1 | | 8/2007 | Nitsche et al. |
| 2008/0192877 A1 | | 8/2008 | Eliezer et al. |
| 2010/0315169 A1 | | 12/2010 | Filipovic et al. |
| 2011/0187426 A1 | | 8/2011 | Moore |
| 2011/0299572 A1 | | 12/2011 | Monsen et al. |
| 2013/0229213 A1 | | 9/2013 | Park et al. |
| 2013/0243044 A1 | | 9/2013 | Husted et al. |
| 2013/0271186 A1 | | 10/2013 | Hossain et al. |
| 2014/0347108 A1 | | 11/2014 | Zerbe et al. |

FOREIGN PATENT DOCUMENTS

| | | |
|---|---|---|
| EP | 1304805 | 4/2003 |
| EP | 2600544 | 6/2013 |
| WO | 9922456 | 5/1999 |
| WO | 2010089168 | 8/2010 |

OTHER PUBLICATIONS

Author Unknown, "3rd Generation Partnership Project; Technical Specification Group Radio Access Network; Evolved Universal Terrestrial Radio Access (E-UTRA); User Equipment (UE) radio transmission and reception (Release 11)," Technical Specification 36.101, Version 11.4.0, Mar. 2013, 3GPP Organizational Partners, 401 pages.

Non-Final Office Action for U.S. Appl. No. 14/259,485, dated Jul. 30, 2015, 8 pages.

Non-Final Office Action for U.S. Appl. No. 14/264,506, dated Aug. 20, 2015, 6 pages.

International Search Report for International Patent Application No. PCT/EP2015/058283, dated Jul. 14, 2015, 3 pages.

International Search Report for International Patent Application No. PCT/EP2015/058982, dated Jul. 24, 2015, 4 pages.

International Search Report for International Patent Application No. PCT/EP2015/064623, dated Nov. 16, 2015, 3 pages.

Mirzaei, Ahmad et al., "21.8 A Pulling Mitigation Technique for Direct-Conversion Transmitters," 2014 IEEE International Solid-State Circuits Conference, Session 21, San Francisco, CA, Feb. 9-13, 2014, IEEE, pp. 374-375.

Notice of Allowance for U.S. Appl. No. 14/449,468, dated Aug. 7, 2015, 8 pages.

"Derive" Dictionary.com, http://www.dictionary.com/browse/derive, accessed Jun. 2, 2016, Random House, Inc., 4 pages.

Final Office Action for U.S. Appl. No. 14/264,506, dated Feb. 2, 2016, 15pg.

Applicant-Initiated Interview Summary for U.S. Appl. No. 14/264,506, dated Mar. 16, 2016, 6 pages.

Final Office Action for U.S. Appl. No. 14/259,485, dated Jan. 21, 2016, 9 pages.

Response to the Non-Final Office Action for U.S. Appl. No. 14/259,485 dated Jul. 30, 2015, filed Oct. 30, 2015, 11 pages.

Response to the Final Office Action for U.S. Appl. No. 14/259,485 dated Jan. 21, 2016, filed Mar. 21, 2016, 8 pages.

Notice of Allowance for U.S. Appl. No. 14/259,485, dated Apr. 11, 2016, 5 pages.

Response to the Non-Final Office Action for U.S. Appl. No. 14/264,506 dated Aug. 20, 2015, filed Nov. 12, 2015, 11 pages.

Response to the Final Office Action for U.S. Appl. No. 14/264,506 dated Feb. 2, 2016, filed Apr. 4, 2016, 9 pages.

Applicant-Initiated Interview Summary for U.S. Appl. No. 14/264,506, filed Apr. 7, 2016, 1 page.

Notice of Allowance for U.S. Appl. No. 14/264,506, dated Apr. 18, 2016, 8 pages.

Amendment after Notice of Allowance (Rule 312) for U.S. Appl. No. 14/449,468, filed Nov. 5, 2015, 9 pages.

Response to Amendment under Rule 312 for U.S. Appl. No. 14/449,468, dated Nov. 19, 2015, 2 pages.

Notice of Allowance for U.S. Appl. No. 14/449,468, dated Jan. 11, 2016, 2 pages.

Request for Certificate of Correction for U.S. Pat. No. 9,257,999, filed Apr. 13, 2106, 5 pages.

Search Report dated Jul. 31, 2016, issued in Chinese Patent Application No. 201280059431.4, 2 pages.

International Search Report and Written Opinion issued in International Application No. PCT/EP2012/073331 dated Jan. 8, 2013, 10 pages.

* cited by examiner

TECHNIQUE FOR CROSSTALK REDUCTION

CROSS-REFERENCE TO RELATED APPLICATIONS

This application is a continuation of application Ser. No. 15/334,970, filed on Oct. 26, 2016 (which published as U.S. 2017/0048089), which is a continuation of application Ser. No. 14/361,929, having a 371(c)(1) date of May 30, 2014 (now U.S. Pat. No. 9,614,702), which is a 35 U.S.C. § 371 National Stage of International Application No. PCT/EP2012/073331, filed Nov. 22, 2012, designating the United States, which claims priority to European Application No. 11009463.8, filed Nov. 30, 2011 and U.S. Provisional Application No. 61/569,521, filed Dec. 12, 2011. The above identified applications and publications are incorporated by this reference.

TECHNICAL FIELD

The present disclosure relates to crosstalk reduction and particularly crosstalk reduction in an integrated circuit (IC) comprising multiple controlled oscillators (COs).

BACKGROUND

Clock signals are important to the functioning of radio communication systems. In such systems, clock signals are required for various purposes, such as synchronization. Without reliable, accurate clock signals, radio communication systems cannot work properly.

In many radio communication devices, such as mobile terminals, radio frequency (RF) clock signals are usually generated by certain on-chip components, e.g., by phase locked loops (PLLs) which can lock to an external crystal resonator as a reference clock input with various dividing factors. Normally, for different components of the device running at different frequencies, multiple PLLs are required in the integrated circuit. For example, for transmitter and receiver circuits of a mobile terminal running at different frequencies, at least two PLLs are usually required.

Multi-function mobile terminals have become popular in the recent years. As mobile terminals become more and more advanced and complicated, multiple RF clock signals are needed for different applications, such as Wireless LAN, Bluetooth, GPS, cellular communication, etc. Moreover, in some newly suggested radio standards, such as 3GPP TS 36.101 v.10.4.0 (2011 September), in order to increase communication data rate, carrier aggregation is suggested, where two or more RF clock signals may be required for the receiver and the transmitter, respectively.

However, creating RF clock signals using multiple PLLs is not an easy task, especially for on-chip integrated solutions. Among others, crosstalk between multiple PLLs is a serious problem.

FIG. 1 illustrates the crosstalk problem between PLLs in a conceptual manner. As suggested in FIG. 1, two PLLs are integrated into one chip. Each PLL comprises a controlled oscillator (CO) to generate the respective clock signal. The controlled oscillator may be an LC-based voltage controlled oscillator (VCO), which comprises an inductor L and a capacitor C, as shown in FIG. 1. This also can be applied to digitally controlled oscillators where inductor and capacitor are employed. Since the coupling coefficient, indicated as $K_{12}$, of the inductors ($L_1$ and $L_2$) of the two respective VCOs ($VCO_1$ and $VCO_2$) is not zero due to electromagnetic radiation. Crosstalk/leakage (including electromagnetic coupling and interference) may be generated between the two PLLs, thus causing an adverse effect to the generation of the clock signals. The interference can be caused by factors such as poor supply de-coupling, unwanted coupling effects of passive and active devices, like package and ESD protection circuits, etc.

More understanding of the crosstalk problem can be gathered from FIG. 2, which shows, in the frequency domain, the clock signals generated by the two PLLs, the crosstalk signals existing there between, and the actual output of the two PLLs.

Specifically, in FIG. 2, $C_1$ and $C_2$ indicate the clock signals generated by $VCO_1$ and $VCO_2$, respectively, $L_1$ indicates the unwanted crosstalk signal from $VCO_1$ to $VCO_2$, and $L_2$ represents the unwanted crosstalk signal in the reverse direction, i.e., from $VCO_2$ to $VCO_1$. $D_{21}$ and $D_{12}$ are power ratios between the power of the wanted clock signals and the power of the respective unwanted crosstalk signals.

When multiple PLLs are integrated into a single chip, they will interfere with each other, and the crosstalk between their VCOs will become a critical issue which can degrade the performance of the PLLs. For example, the PLLs will suffer from increased phase noise, frequency shift, and difficulty in locking. In the worst case, the PLLs may fail to perform the locking. The crosstalk depends on several factors. Two typical factors are the physical distance and the frequency difference between two PLLs in question.

One way to reduce the crosstalk between multiple PLLs is to physically separate the PLLs apart. For instance, with reference to the LC-based PLLs illustrated in FIG. 1, the two inductors L1 and L2 of the respective controlled oscillators can be positioned on the same chip but far from each other.

A result from electromagnetic simulation for the coupling between the two inductors is shown in FIG. 3, where the normalized distance is the ratio of separation distance divided by the diameter of the inductors, and the coupling coefficient is the isolation between the two inductors.

Although this separation solution can reduce the crosstalk between multiple PLLs on a chip, it is sometimes impractical due to the requirement of a large silicon area. This is especially true where the chip for hosting the PLLs must be small. Thus, the solution could become expensive, in particular for implementations requiring deep nanometer CMOS techniques. Moreover, the metal usage for routing among the separation area between the two inductors could make the situation even worse.

SUMMARY

It is therefore an object to cancel, minimize, or at least reduce the crosstalk between multiple COs arranged in an integrated circuit.

In a first aspect, an arrangement is provided for reducing a crosstalk signal generated by a first controlled oscillator (CO) to a second CO, both of which are comprised in an integrated circuit. Each CO is adapted to output a respective clock signal. The arrangement comprises a (first) detector adapted to detect the crosstalk signal and a (first) crosstalk cancellation circuit adapted to generate a cancellation signal. The cancellation signal is of substantially the same amplitude as that of the crosstalk signal, but the phase of the cancellation signal is substantially opposite to that of the crosstalk signal. Further, the arrangement comprises a (first) cancellation signal injector adapted to introduce the cancellation signal into the second CO.

The (first) detector may comprise a mixer stage adapted to produce a mixed signal by mixing the clock signal generated by the second CO with another CO clock signal, wherein the other clock signal has a (e.g., fixed) relationship with the clock signal generated by the second CO. The detector may further comprise a filter adapted to at least partially remove one or more direct current (DC) components and/or one or more undesired mixing products (such as integer times of the frequency difference between the second CO and another CO) from the mixed signal. The "filter" mentioned above may be implemented by one or more filter stages. As a result of the removal, a filtered signal is produced. The detector may further comprise a signal convertor adapted to convert, or down-convert, the filtered signal into a DC signal and an output for outputting the DC signal as an indication for the crosstalk signal.

The arrangement may further comprise a controller adapted to provide a controlled signal to adjust the amplitude and/or the phase of the cancellation signal. The adjustment may be performed based on the indication for the crosstalk signal.

The (first) crosstalk cancellation circuit of the arrangement may further comprise at least one of a variable gain amplifier and a variable phase shift circuit. The variable gain amplifier may be adapted to adjust the amplitude of the cancellation signal whereas the variable phase shift circuit may be adapted to adjust the phase of the cancellation signal.

The (first) crosstalk cancellation circuit may further comprise an adjustment circuitry adapted to adjust the cancellation signal, wherein the adjustment circuitry may comprise a quadrature phase splitter adapted to provide a first cancellation signal component with a first phase shift and to provide a second cancellation signal component with a second phase shift, where the difference between the first and second phase shifts is essentially 90 degrees. The adjustment circuitry may further comprise at least one of a first variable gain amplifier adapted to adjust an amplitude of the first cancellation signal component and a second variable gain amplifier adapted to adjust an amplitude of the second cancellation signal component, such that the (first) crosstalk cancellation circuit is adapted to generate the cancellation signal as a sum of the first and second cancellation signal components with any amplitude adjustment.

The signal converter mentioned above may comprise one of a rectifier and a component which comprises a low pass filter and an amplifier arranged such as to extract the magnitude of the filtered signal.

The (first) cancellation signal injector mentioned above may further comprise a buffer adapted to isolate the cancellation signal from the second CO. The (first) injector may further comprise a coupler for coupling the cancellation signal to the second CO. The coupler provides coupling of either an inductive type or a capacitive type. Furthermore, on-chip twisted differential transmission lines may be provided in the arrangement between the first CO and the second CO.

The above-mentioned arrangement may further comprise a second detector for detecting another crosstalk signal, this signal is being generated by the second CO to the first CO. The arrangement may further comprise a second crosstalk cancellation circuit adapted to generate another cancellation signal having an amplitude substantially the same as that of the crosstalk signal detected by the second detector and a phase substantially opposite to that of the crosstalk signal. Further, the arrangement may comprise a second cancellation signal injector adapted to introduce the other cancellation signal into the first CO.

According to a second aspect, this disclosure provides a radio communication device comprising one or more of the arrangements mentioned above. The radio communication device may be realized in the form of a mobile telephone, smartphone, data or network card, and so on.

According to a third aspect, a method is provided for reducing a crosstalk signal generated by a CO to a second CO, both comprised in an integrated circuit arrangement. Each CO may be configured to output a respective clock signal. The method comprises the steps of detecting a crosstalk signal generated by the first CO to the second CO, generating a cancellation signal having an amplitude substantially the same as that of the crosstalk signal and a phase substantially opposite to that of the crosstalk signal, and injecting the cancellation signal into the second CO to reduce the crosstalk signal.

The step of detecting the crosstalk signal may further comprise producing a mixed signal by mixing the clock signal generated by the second CO with another CO clock signal having a fixed relationship with the clock signal generated by the second CO ("fixed" means that no other variable affects the relationship between the first and second clock signals). For example, the second clock signal may be derived from the first clock signal by letting the first clock signal pass, say, a phase shifter, a limiter, and/or a filter. (The "filter" may be implemented by one or more filters.) Thus, the second clock signal is more or less a copy of the first clock signal possibly with some modification but at least having the same dominant spectral components), at least partially removing one or more DC components and/or one or more undesired mixing products (such as integer times of the frequency difference between the first CO and the other CO) from the mixed signal by filtering to thereby produce a filtered signal, down-converting the filtered signal into a DC signal, and outputting the DC signal as an indication for the crosstalk signal.

Based on the indication for the crosstalk signal, the amplitude and/or the phase of the cancellation signal may further be controlled.

The method mentioned above may further comprise detecting a second crosstalk signal generated by the second CO to the first CO, generating another cancellation signal having an amplitude substantially the same as that of the second crosstalk signal and a phase substantially opposite to that of the second crosstalk signal, and injecting the cancellation signal into the first CO to reduce the second crosstalk signal.

BRIEF DESCRIPTION OF THE DRAWINGS

In the following, the crosstalk reduction technique presented herein is further described with reference to the exemplary embodiments illustrated in the figures, in which.

DETAILED DESCRIPTION

In the following, for purposes of explanation and not limitation, specific details are set forth in order to provide a thorough understanding of the present disclosure. It will be apparent to those skilled in the art that this disclosure may be practiced in embodiments that depart from these specific details. For instance, although the exemplary embodiments are described in connection with reference to integrated circuits comprising two PLLs each having a controlled oscillator, such as a voltage controlled oscillator, which are for generating respective clock signals and comprise two inductors respectively which have a coupling coefficient K there between, it should be noted that the crosstalk reduction technique presented in this disclosure is not limited to the physical layout of any of the exemplary integrated circuits described below. For instance, more than two PLLs may be provided in the integrated circuit, other clock-generating components may replace the controlled oscillators, and so on.

Figure 1:
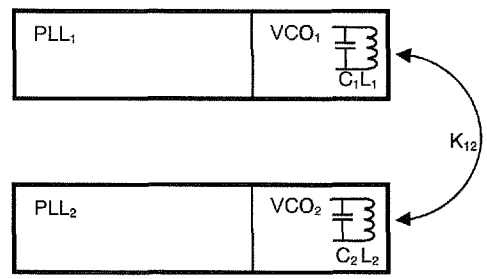
FIG. 1 is a block diagram conceptually illustrating the crosstalk phenomenon associated with two on-chip PLLs employing two LC-based controlled oscillators respectively.
Figure 2:
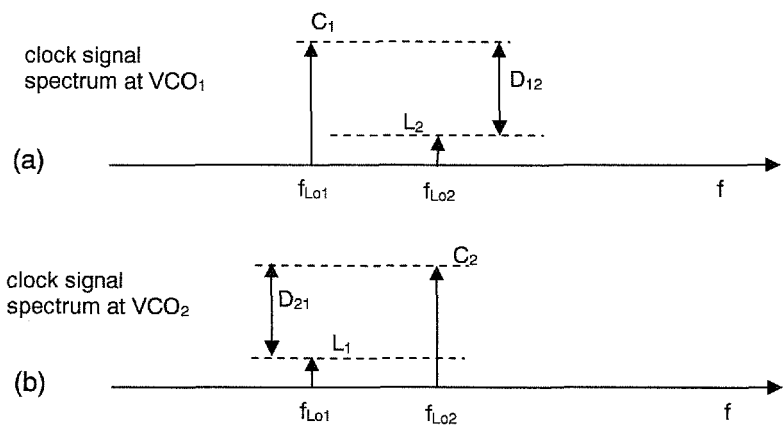
FIG. 2 is a spectrum diagram illustrating the clock signals generated by two controlled oscillators of two respective on-chip PLLs, the crosstalk signals created there between and the actual output of the controlled oscillators.
Figure 3:
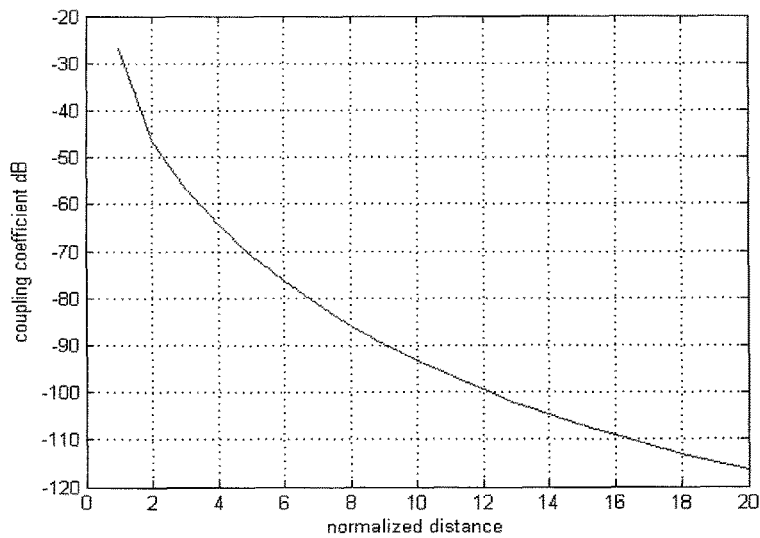
FIG. 3 is a chart showing a result of an electromagnetic (EM) simulation with respect to coupling between two coils, the coils being employed in the inductors of the two controlled oscillators of two respective LC-based PLLs.
Figure 4:
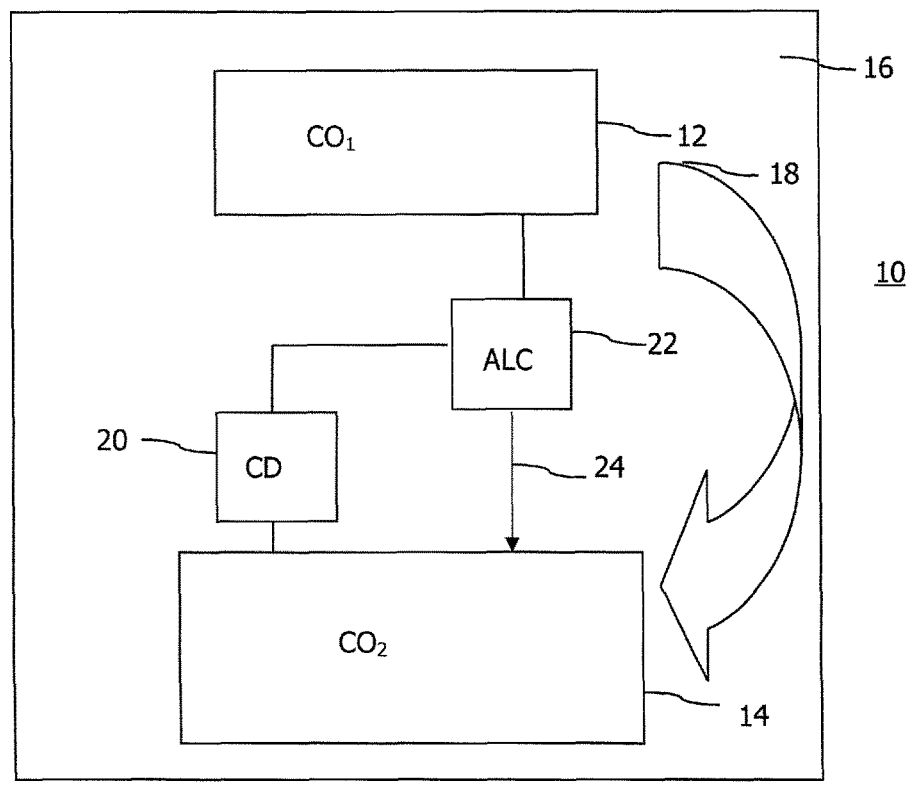
FIG. 4 is a block diagram showing a first exemplary arrangement for reducing crosstalk between two controlled oscillators of two respective PLLs, both comprised in an integrated circuit.

FIG. 4 is a block diagram illustrating a first exemplary arrangement for crosstalk reduction. The arrangement is indicated as 10, and it functions to reduce the crosstalk between two controlled oscillators $CO_1$ and $CO_2$, indicated as 12 and 14 respectively (e.g., of two respective PLLs, not shown in FIG. 4) arranged in an integrated circuit 16. Particularly, as shown in FIG. 4, the crosstalk to be reduced, figuratively indicated by the arch 18, is generated by the first controlled oscillator ($CO_1$) 12 to the second controlled oscillator ($CO_2$) 14. Each controlled oscillator 12, 14 is configured to output a respective clock signal. The arrangement 10 comprises a detector CD 20 adapted to detect the crosstalk signal (that is, the detector 20 may be regarded as a crosstalk detector) and a crosstalk cancellation circuit ALC 22 adapted to generate a cancellation signal. The amplitude of the cancellation signal is substantially the same as that of the crosstalk signal 18, while the phase of the cancellation signal is substantially opposite to that of the crosstalk signal 18. The arrangement 10 further comprises a cancellation signal injector, figuratively indicated by the pointed arrow 24, adapted to introduce the cancellation signal into the second controlled oscillator.

Figure 15:
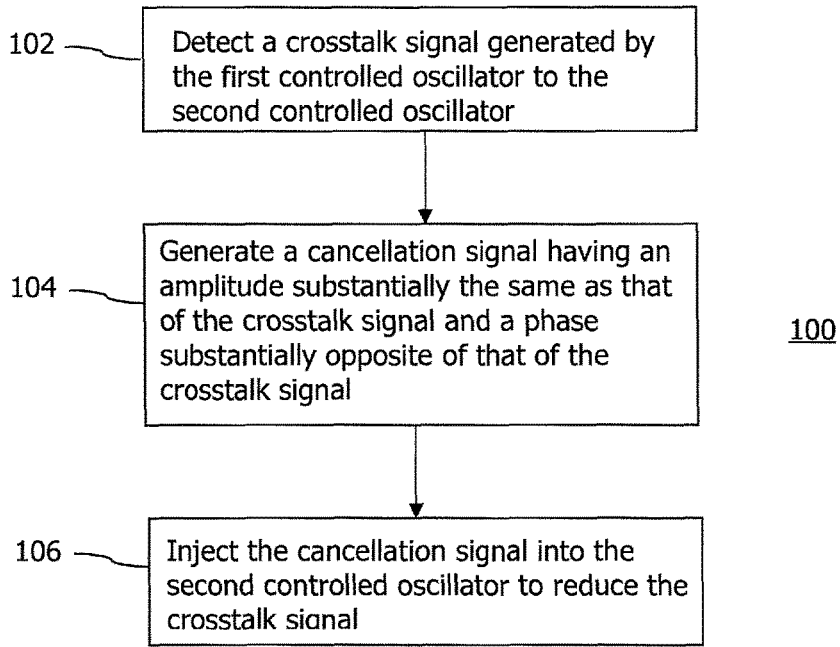
FIG. 15 is a flowchart illustrating an exemplary method of the crosstalk-reduction technique provided in the present disclosure.

Corresponding to the exemplary arrangement 10 shown in FIG. 4, a method can be provided for crosstalk reduction between multiple controlled oscillators (of, e.g., PLLs) on-chip. An embodiment of the method, shown in FIG. 15 as flowchart 100, can reduce the crosstalk signal generated by the first controlled oscillator $CO_1$ 12 to the second controlled oscillator $CO_2$ 14, both comprised in the integrated circuit 16. The controlled oscillators $CO_1$ 12 and $CO_2$ 14 are adapted to output respective clock signals.

The method comprises the following steps: At step 102, a crosstalk signal generated by the first controlled oscillator $CO_1$ 12 to the second controlled oscillator $CO_2$ 14 is detected. At step 104, a cancellation signal is generated which has an amplitude substantially the same as that of the crosstalk signal and a phase substantially opposite thereto. Then at step 106, the cancellation signal is injected into the second controlled oscillator $CO_2$ 14 to reduce the crosstalk signal.

In the following arrangements, which illustrate optional details of the second arrangement 10 illustrated in FIG. 4, it is assumed that $PLL_1$ and $PLL_2$ comprise $VCO_1$ and $VCO_2$, which comprise inductors $L_1$ and $L_2$ having coupling coefficient $K_{12}$, respectively. The arrangements comprise an active crosstalk cancellation loop, or active leakage cancellation loop (ALCL) to cancel the leakage/crosstalk between the PLLs.

Figure 5:
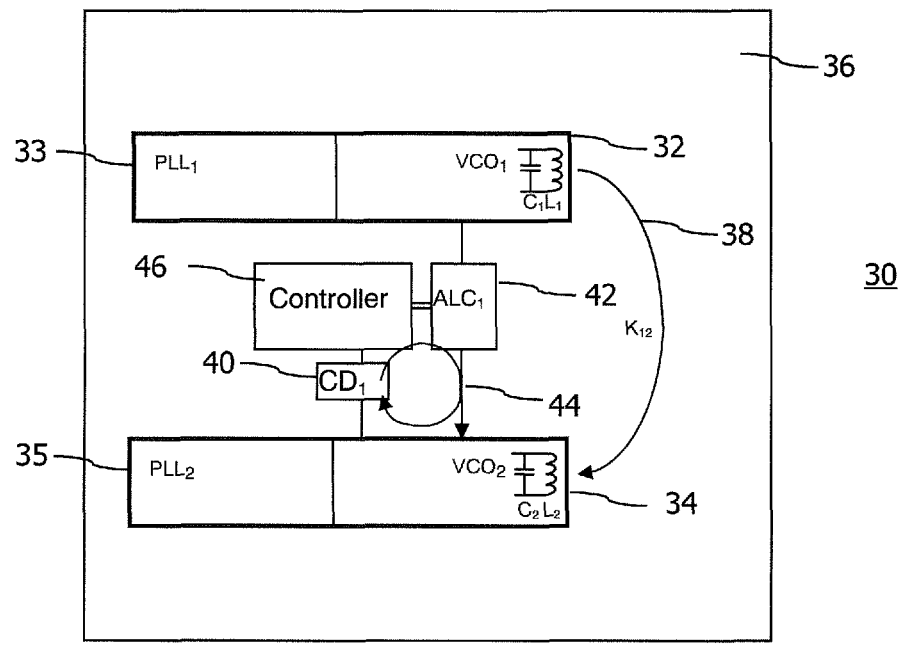
FIG. 5 is a block diagram showing a second exemplary arrangement for reducing crosstalk between two controlled oscillators of the two respective PLLs, both comprised in an integrated circuit.

FIG. 5 shows a second exemplary arrangement for crosstalk reduction. Similar to the case with FIG. 4, the arrangement 30 in FIG. 5 is adapted to reduce a crosstalk signal generated between two PLLs, $PLL_1$ 33 and $PLL_2$ 35, comprised in an integrated circuit 36. Both PLLs 33 and 35 comprise a controlled oscillator, $VCO_1$ 32 and $VCO_2$ 34, respectively, which are adapted to generate, or output, respective clock signals. The controlled oscillators $VCO_1$ 32 and $VCO_2$ 34 shown in FIG. 5 are of the LC-based type, but other types of clock generation components are possible as well. The coupling coefficient $K_{12}$, indicated by the arch 38 in FIG. 5, creates electromagnetic coupling between the two inductors $L_1$ and $L_2$ of the respective controlled oscillators, resulting in a crosstalk signal originated from the first controlled oscillator $VCO_1$ 32 to the second controlled oscillator $VCO_2$ 34 as generally described above.

The arrangement 30 further comprises a circuitry between the two controlled oscillators 32 and 34 for reducing the crosstalk there between. The circuitry is termed as an active leakage cancellation loop, ALCL. Arranged between the two controlled oscillators 32 and 34, the active leakage cancellation loop ALCL comprises a (first) detector $CD_1$ 40, adapted to detect the crosstalk signal (that is, the (first) detector $CD_1$ 40 may be regarded as a crosstalk detector). The active leakage cancellation loop ALCL further comprises a (first) crosstalk cancellation circuit $ALC_1$ 42, adapted to generate a cancellation signal, which has an amplitude substantially the same as that of the crosstalk signal and a phase substantially opposite to that of the crosstalk signal. Further, as figuratively indicated by the pointed arrow leaving the crosstalk cancellation circuit $ALC_1$ 42 to the second controlled oscillator $VCO_2$ 34 in the figure, the arrangement 30 further comprises a (first) cancellation signal injector 44 for introducing the cancellation signal into the second controlled oscillator $VCO_2$ 34.

Stable/periodical interference having fixed spectrum, introduced by supply networks, package or ESD protection circuits, can also be reduced by the cancellation signal. In presence of both electromagnetic coupling and stable/periodical interference, at the crosstalk frequency their effect can be merged together and viewed as one source of crosstalk signal.

In some implementations, the active leakage cancelation loop ALCL may further comprise a controller, as indicated by 46 in the arrangement 30 of FIG. 5. The controller 46 is adapted to provide a control signal to adjust the amplitude and/or the phase of the cancelation signal.

The arrangement 30 for crosstalk reduction shown in FIG. 5 may be seen as a single-loop implementation, since the active leakage cancellation circuit is adapted to cancel the crosstalk signal in a single direction, i.e., from the first controlled oscillator $VCO_1$ 32 to the second controlled oscillator $VCO_2$ 34. To account for crosstalk signals between the two controlled oscillators 32 and 34 in both directions, another arrangement comprising a twin-loop active leakage cancellation circuitry can be used. An exemplary twin-loop arrangement is shown in FIG. 6.

Figure 6:
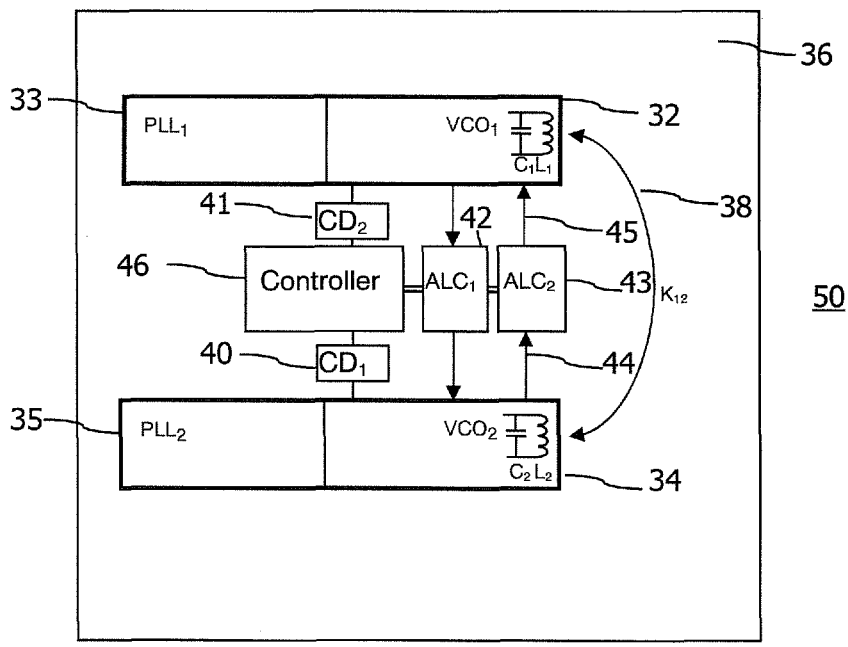
FIG. 6 is a block diagram showing a third exemplary arrangement for reducing crosstalk between two controlled oscillators of two respective PLLs, both comprised in an integrated circuit.

On top of the single-loop implementation of FIG. 5, the arrangement 50 shown in FIG. 6 further comprises a second detector $CD_2$ 41 ("crosstalk detector") for detecting another crosstalk signal, which is the crosstalk signal generated by the second controlled oscillator $VCO_2$ 34, the controlled oscillator of $PLL_2$ 35, to the first controlled oscillator $VCO_1$ 32, the controlled oscillator of $PLL_1$ 33. The arrangement 50 further comprises a second crosstalk cancellation circuit $ALC_2$ 43, adapted to generate another cancellation signal, which has an amplitude substantially the same as and a phase substantially opposite to that of the crosstalk signal detected by the second detector $CD_2$ 41. Further, as figuratively indicated by the pointed arrow 45 leaving the second crosstalk cancellation circuit $ALC_2$ 43 to the first controlled oscillator $VCO_1$ 32 in the figure, the arrangement 50 further comprises a second cancellation signal injector 45 for introducing the second cancellation signal into the first controlled oscillator $VCO_1$ 32.

More specifically regarding the arrangement 50 shown in FIG. 6, an active leakage cancellation loop, ALCL, for reducing the crosstalk between the two VCOs 32 and 34 in both directions, is shown. The coupling coefficient $K_{12}$ is indicative of the electromagnet coupling between the inductors $L_1$ and $L_2$ of the VCOs 32 and 34, respectively, causing the leakage/crosstalk in both directions (i.e., from the $VCO_1$ 32 to the $VCO_2$ 34 and vice versa) as the coupling follows the reciprocity principle. For the same reason, the stable/periodical interference can also occur in both directions.

In order to achieve crosstalk cancellation in both directions, two active leakage cancellation circuits $ALC_1$ 42 and $ALC_2$ 43 are provided in the ALCL, which create two respective cancellation signals each with substantially the same amplitude but a substantially opposite phase with respect to the respective crosstalk signals. Crosstalk detectors $CD_1$ 40 and $CD_2$ 41 are used to detect the crosstalk and create an error signal. A controller 46 may again be employed to generate a control signal for minimizing the crosstalk. The control signal may be in the form of a vector signal. That is, in the twin-loop implementation, each single loop comprises an active leakage cancellation circuit, a crosstalk detector, and preferably a controller. In many cases, two or multiple loops can share the same controller.

With respect to the twin-loop crosstalk cancellation arrangement, an example of which, 50, is shown in FIG. 6, another exemplary method can be provided for cancelling the crosstalk between two controlled oscillators in both directions. This exemplary comprises, further to the steps of the method 100 shown in FIG. 15, the following additional steps: a second crosstalk signal, i.e., the crosstalk signal generated by the second controlled oscillator to the first controlled oscillator, is detected; another cancellation signal is generated which has an amplitude substantially the same as and a phase substantially opposite to that of the second crosstalk signal; and the second cancellation signal is injected into the first controlled oscillator to cancel the second crosstalk signal.

It should be emphasized that the crosstalk reduction technique proposed in this disclosure not only can cancel the crosstalk between two controlled oscillators (of e.g., PLLs), but also can be, in general, applied to more general cases where crosstalk between more than two controlled oscillators needs reduction. However, for ease of understanding, the detailed description herein is mainly focused on the examples involving two controlled oscillators.

Figure 7:
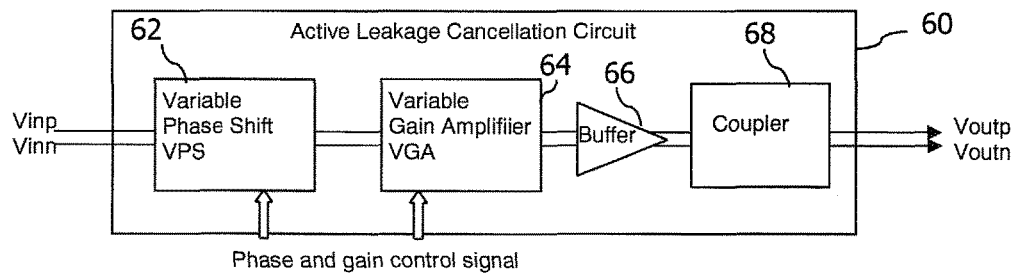
FIG. 7 is a block diagram showing an exemplary active crosstalk cancellation circuit which can be employed in the various crosstalk-reduction arrangements described in the present disclosure.

Referring to FIG. 7, the crosstalk reduction arrangement presented in this disclosure, such as the single-loop arrangements 10, 30 and the twin-loop arrangement 50 described above, and particularly the active leakage cancellation circuit ALC used therein, may further comprise one or more of a variable phase shift circuit (VPS), indicated as 62 in FIG. 7, a variable gain amplifier (VGA) 64, an output buffer 66, and a coupler 68. The ALC can have either a pair of differential outputs or a single-ended output, and the differential version is illustrated in FIG. 7, where the control signal comprises polar phase control information and gain control information. For example, the VPS 62 may be implemented with a switched variable RC delay unit using multiphase clocks.

Figure 8:
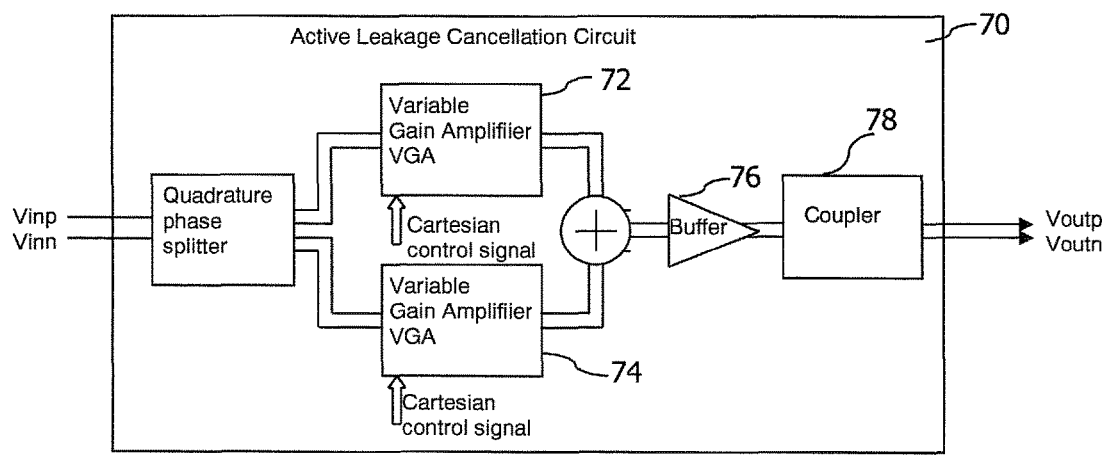
FIG. 8 is a block diagram showing an another exemplary active crosstalk cancellation circuit which can be employed in the various crosstalk-reduction arrangements described in the present disclosure.

An alternative to the exemplary active leakage cancellation circuit 60 of FIG. 7 is shown in FIG. 8, which is based on a vector modulator using Cartesian control signals corresponding to the phase and gain components as showed in FIG. 8.

With respect to the exemplary active leakage cancellation circuits 60 and 70 of FIGS. 7 and 8, the input differential signals Vinp and Vinn may be coupled from a first VCO output either directly or indirectly. Further, in twin-loop implementations, the output differential signals Voutp and Voutn may be coupled to a second VCO output, either directly or indirectly. Further, in VPS 62, the output phase of the differential signals may be adjusted, and in VGA 64, 72 and 74 the output amplitude of the differential signals can be adjusted, by setting the phase and gain vector control signal.

The buffer stage 66, 76 can isolate the VGA output from the second VCO output, to, among others, prevent backward propagation. The buffer stage 66, 76 may be arranged within the VGA 64, 72 and 74.

Figure 9:
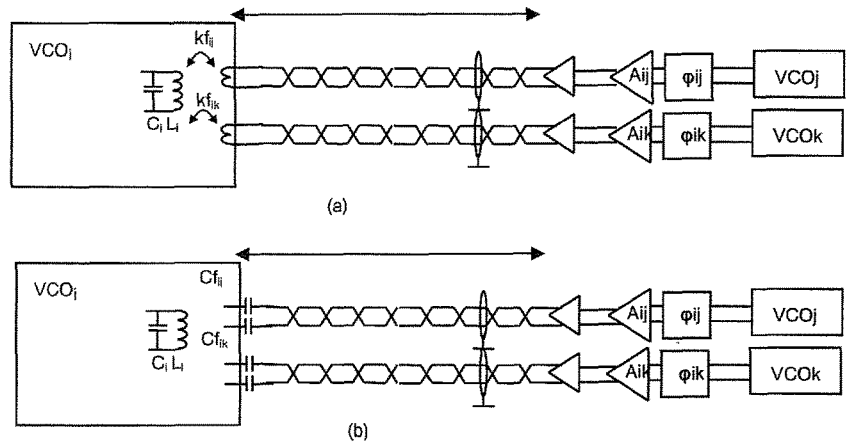
FIG. 9 is a block diagram showing two examples of couplers and transmission wire pair which may be used in the crosstalk-reduction arrangements described in the present disclosure.

The coupler 68, 78 can be implemented in different ways. As two examples, couplers based on inductive coupling and capacitive coupling are illustrated in FIGS. 9(a) and (b), respectively. Further, as shown in FIG. 9, twisted differential transmission lines may be used to drive the wire pair between two controlled oscillators to reduce unwanted radiation. Shielding methods may be further employed to prevent the unwanted radiation of the twisted differential transmission lines.

Figure 10:
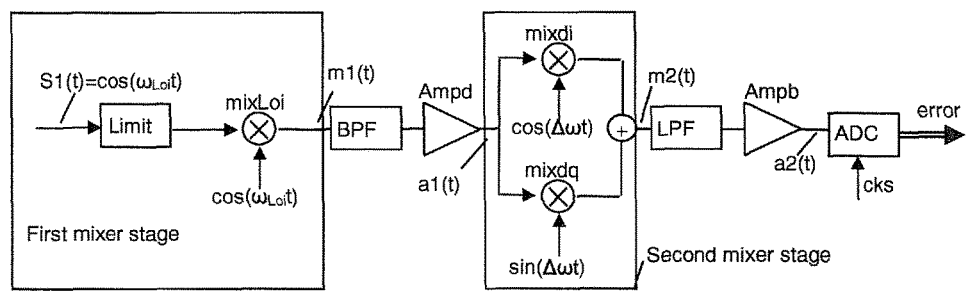
FIG. 10 is a block diagram showing a first exemplary crosstalk detection technique which may be used in the various crosstalk-reduction arrangements presented in this disclosure.
Figure 10:
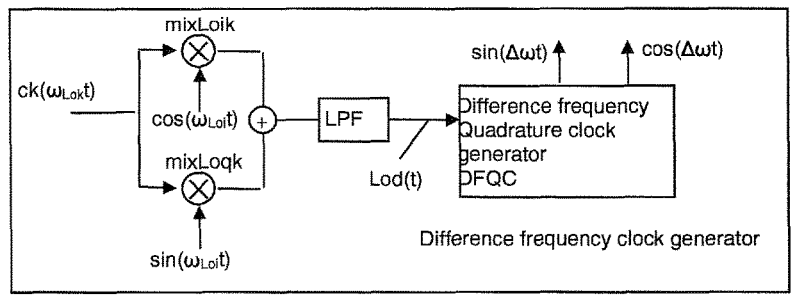

A first exemplary crosstalk detector 80 is shown in FIG. 10. This detector is based on self-mixing, where the crosstalk between two PLLs, represented as the $i^{th}$ PLL and the $k^{th}$ PLL, is concerned. As shown in FIG. 10, to detect the crosstalk at the $i^{th}$ controlled oscillator, such as VCO; which generates clock frequency $f_{Loi}$, two mixer stages may be employed. The first mixer stage comprises mixer mixLoi, driven respectively by the clock signal $\cos(\omega_{Loi} t)$, here $\omega_{Loi}=2\pi f_{Loi}$, and the input signal, $S1(t)=\cos(\omega_{Loi}t)$, may be the same clock signal from the VCOi.

In an alternative case (also shown in FIG. 10), a limiter, indicated as Limit in the figure, may be inserted in the front of the mixer, which can limit the fundamental clock amplitude and enlarge the crosstalk signal. The outputs of the quadrature mixers are added together with a complex adder. The crosstalk signal is down-converted to a difference frequency $\Delta f_{ik}=f_{Loi}-f_{Lok}$ that is the difference frequency between the $i^{th}$ VCO and the $k^{th}$ VCO.

The self-mixing scheme can be expressed in the following formula:

$$S1(t) \cdot S1(t) =$$
$$(C_i \cos(\alpha) + L_k \cos(\beta)0^2 = 0.5[C_i^2(1+\cos(2\alpha)) + L_k^2(1+\cos(2\beta)) +$$
$$2C_iL_k (\cos(\alpha-\beta) + 2C_iL_k (\cos(\alpha+\beta)] =$$
$$0.5(C_i^2 + L_k^2) + C_iL_k (\cos(\alpha-\beta) +$$
$$0.5(C_i^2 \cos(2\alpha) + L_k^2 \cos(2\beta) + 2C_iL_k (\cos(\alpha+\beta))$$
Here $\alpha = 2\pi f_{LO1} + \theta_1$, and $\beta = 2\pi f_{LO2} + \theta_2$ After BPF filtering, the DC components and/or one or more undesired mixing products such as integer times of the frequency difference between COs, are removed, so basically only the term $C_iL_k \cos(\alpha-\beta)$ is left at the output of the first mixer stage.

Figure 11:
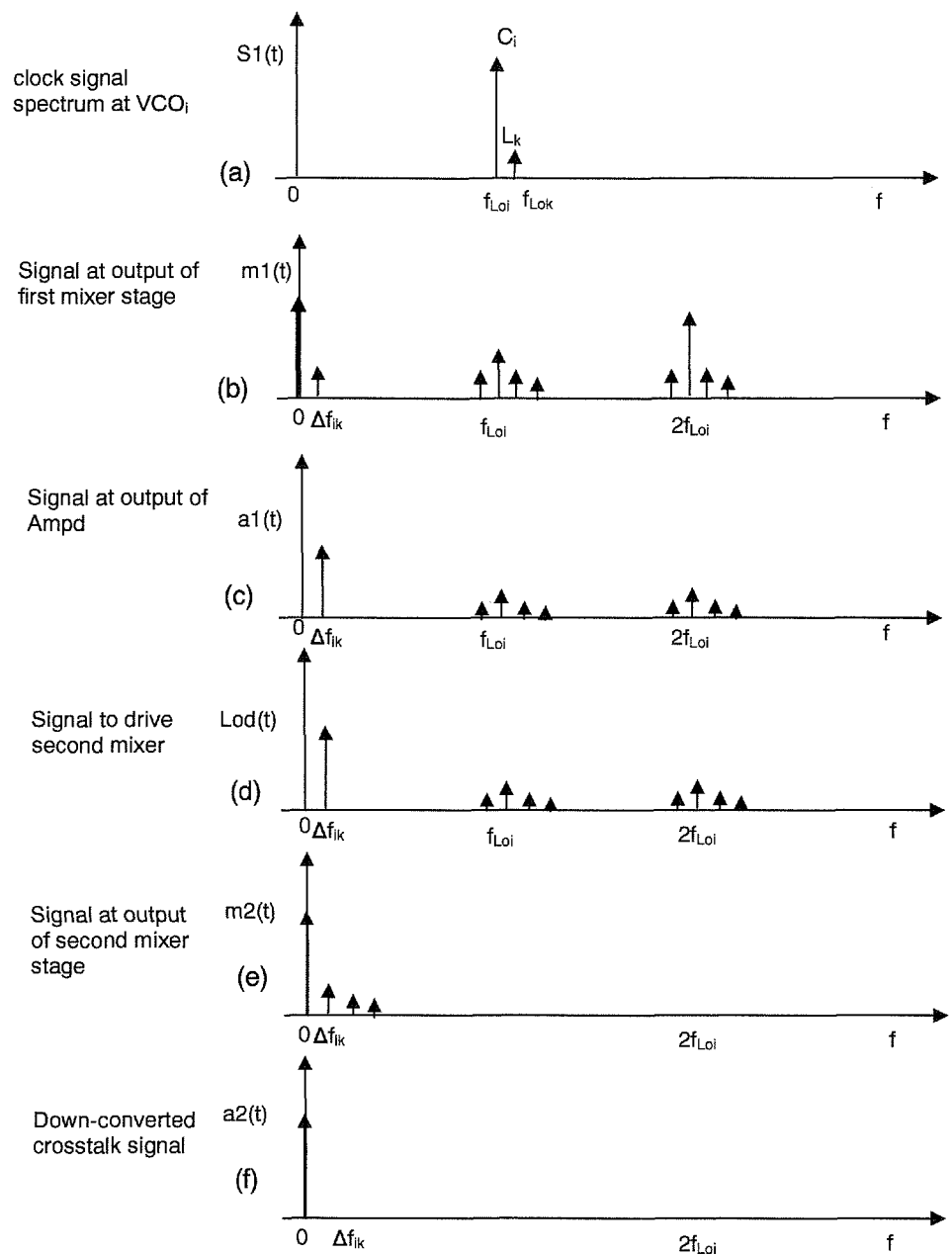
FIG. 11 is a spectrum diagram showing the signal spectra at different locations of a second exemplary crosstalk detection technique which may be used in the various crosstalk-reduction arrangements presented in this disclosure.

Reference is now made to FIG. 11, which shows several spectra associated with the crosstalk detection technique introduced above. Assume that VCOi has an output clock signal comprising crosstalk interference shown in FIG. 11(a). In practice, as the mixer is non-ideal multiplier, it creates an output m1(t) having spectrum shown in FIG. 11(b). At the output of the band pass filter BPF, the DC component is removed, preferably completely, and other inter-modulation tones may also be suppressed effectively. The filtered version of m1(t) is fed to the amplifier Ampd operating at a difference frequency. In practice, the BPF may be implemented as a combination of a high pass filter and a low pass filter. The function of the high pass filter is to remove the DC component created by the clock signal mixing. The low pass filter is to reduce the undesired mixing products and inter-modulation products. The spectrum of the amplified signal a1(t) is shown in FIG. 11(c).

In the second mixer stage, the local clock signals are created by mixers mixLoik and mixLoqk where the clock signals from both VCOi and VCOk are mixed to create the difference frequency $\Delta f_{ik}$. After a low pass filter LPF which removes, among others, some higher order products, a clean difference frequency clock Lod(t) with spectrum shown in FIG. 11(d) is created. Through the difference frequency quadrature clock generator DFQC, quadrature clocks sin($\Delta\omega t$) and cos($\Delta\omega t$) are created which are used as LO signals to drive the second mixer stage. After the second mixer stage, the crosstalk signal is down-converted into DC signal m2(t), shown in FIG. 11(e). Through the low pass filter LPFb and the baseband amplifier Ampb both operating at baseband frequency, the crosstalk signal is filtered and enlarged at DC frequency. Then an ADC may be employed which converts the analog crosstalk signal into a signal, or an error signal, of the digital form.

If the difference frequency generation shown in FIG. 11 can be considered as "VCOi mix VCOk", there may be another way to generate the difference frequency by using "VCOk mix VCOi", for example, by swapping the signals used at the mixer input and clock input nodes.

The requirement for the band pass filter is not stringent, as any two signals of undesired mixing products/inter-modulation products may create a crosstalk component by further mixing if the two signals have a frequency of $\Delta f_{ik}$. As the further mixing of the higher order inter-modulation products shown in FIG. 11(b) will also contribute to DC component, proportional to the crosstalk as well, the band pass filter BPF shown in FIG. 10 may be replaced by a high pass filter HPF, making it easy in actual implementation.

The amplifier Ampd may employ several stages, such as cascaded stages, to provide enough gain for the accurate detection about the crosstalk, and it is operating at the difference frequency, so AC coupling can be used for the connections between the stages, solving the difficult DC shift issues normally associated with a high gain amplifier.

The amplifier Ampb is operating at DC condition, the DC offset can be an issue. However, it can be solved by using chopping technique that modulates the flicker noise to higher frequency. One of the chopping switches can be placed at output of amplifier Ampb, and the other can be inserted at any node of the crosstalk detection path, such as m1(t), a1(t) and m2(t). The impact of the flicker noise in Ampb may also be reduced by increasing the gain in amplifier Ampd.

Figure 12:
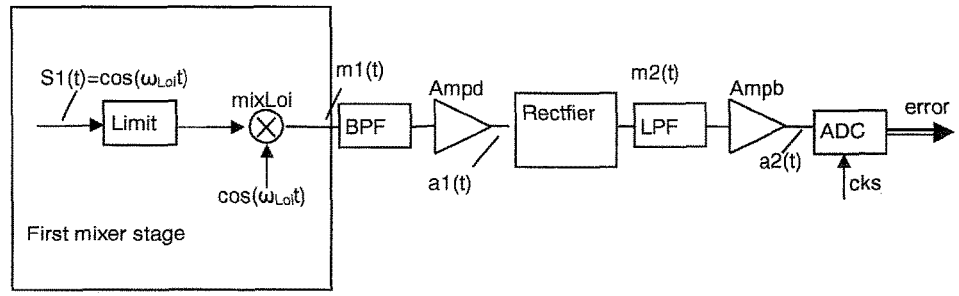
FIG. 12 is a block diagram showing a third exemplary crosstalk detection technique which may be used in the various crosstalk-reduction arrangements presented in this disclosure.

As the crosstalk signal is finally down-converted into a DC signal, only the amplitude of it is interesting. As an alternative, amplitude, envelope, power, or peak detection methods can be used in crosstalk detection. For example, a rectifier may be inserted before the LPFb, and the second mixer stage and the difference frequency clock generator may be removed, as shown in FIG. 12. This crosstalk detector based on peak detection or a rectifier is simpler than that of FIG. 10 where two mixer stages are employed. On the other hand as a normal rectifier needs a large amplitude at its input to operate at nonlinear region, the amplifier Ampd should provide more gain than the crosstalk detector or circuit shown in FIG. 10.

In some applications, there may be two PLLs placed within a very small separation distance yet requiring a very low level of crosstalk between them (after reduction). As a consequence, the crosstalk detector may have a large dynamic range to cope with the initial level of detected crosstalk as well as the target level. In particular the amplifier Ampd should be kept out of saturation so as to ensure a correct error gradient to the controller. In this case, a variable gain amplifier may be required for Ampd so the gain setting is low at the of beginning of the calibration. As the calibration progresses the residual error becomes small, thus higher gain is required for the amplifier Ampd.

Because the residual signal is finally down-converted to a DC signal, the design of low pass filter LPF can be easy. For example, a first order RC filter may be sufficient to remove the difference frequency component and at least some of its undesired mixing products. However, the bandwidth of the LPF will impact the setup time due to the fact that the product fc·ts is a constant, where fc is the bandwidth and ts is the setup time. For the first order LPF, the product is 0.35, reducing the bandwidth of the LPF may reduce the noise impact and increase the sensitivity of the detection.

However, on the other hand, it increases setup time for the residual signal and slows down the calibration speed. Therefore, a variable bandwidth may be preferable for the crosstalk detector. During the beginning of a calibration, a wider bandwidth of LPF may be employed, and the bandwidth will reduce as the calibration progresses.

This also implies that the sampling frequency of the clock used in the ADC can be changed by the controller.

As the residual error signal is a DC signal, in a calibration procedure, the criteria of minimizing the error can be employed to reduce the crosstalk between the PLLs.

Figure 13:
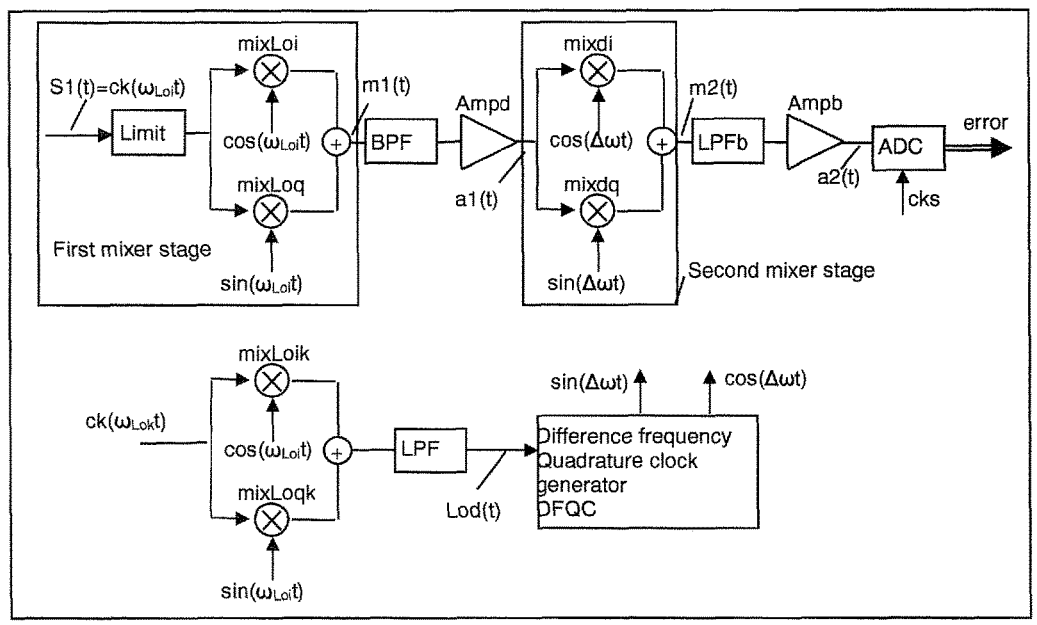
FIG. 13 is a block diagram showing a fourth exemplary crosstalk detection technique which may be used in the various crosstalk-reduction arrangements presented in this disclosure.

A further exemplary crosstalk detector is illustrated in FIG. 13 where the first mixer stage includes a quadrature mixer that may work with a VCO signal $S1(t)=ck(\omega_{Lo_i}t)$ having a fixed unknown relationship with the quadrature clock signals.

Figure 14:
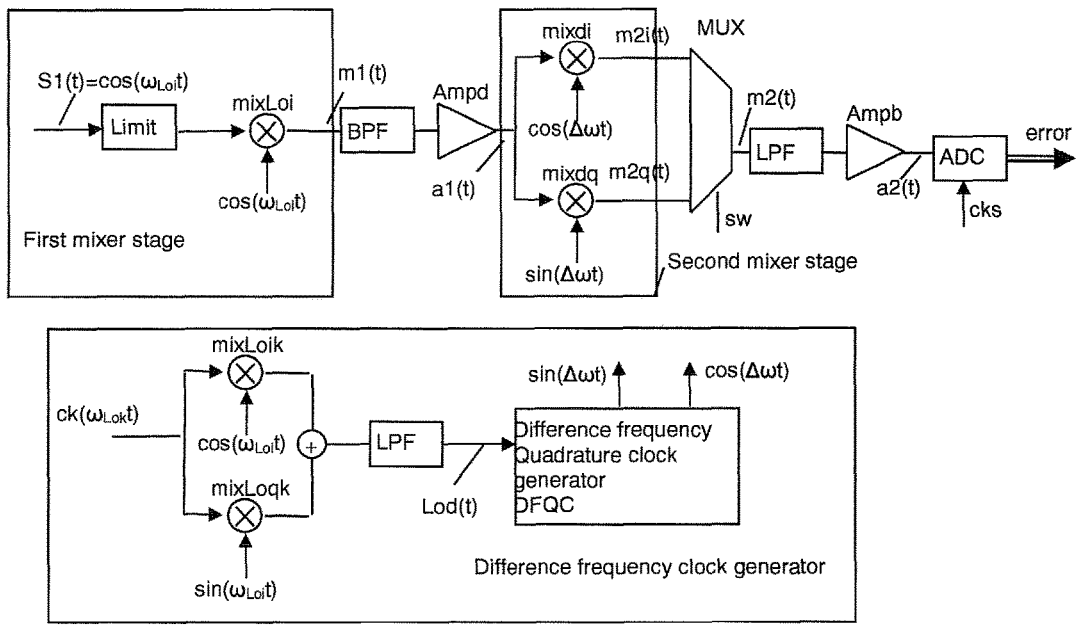
FIG. 14 is a block diagram showing a fifth exemplary crosstalk detection technique which may be used in the various crosstalk-reduction arrangements presented in this disclosure.

Another variation of FIG. 10 can be seen in FIG. 14, where the adder after the second mixer stage is replaced with a multiplexer MUX controlled by signal sw. With this variation, the low pass filter LPF, the amplifier Ampb, and the analog-to-digital converter ADC are shared by the two quadrature output signals $m2i(t)$ and $m2q(t)$ from the quadrature mixer mixdi and mixdq. As such, the quadrature outputs can be obtained which comprise both phase and amplitude information which can be provided to the controller, and the controller will speed up the calibration procedure effectively.

The controller can be implemented in many ways. One way is utilizing the general processor that already exists in a modern wireless communication device. Another way is to have a digital hardware comprising a finite state machine or logic and storage units performing a routine work of calibration.

For multiple PLL applications, the calibration can be done between all possible pairs. Assume there are m PLLs, then the calibrated pairs are:

Calibration(i,k), for {all i,k∈ [1,m],i≠k}

Of course, for two PLLs having an enough separation distance or difference frequency, the calibration in this pair for reducing the crosstalk can be skipped, also depending on the radio standards.

After calibration, the residual error becomes small, and the normalized residual error can be approximated as $$\text{error}(i, k) = \frac{1}{\sqrt{\Delta A_{ik}^2 + \Delta \theta_{ik}^2}},$$

where $\Delta A i_k$ is the normalized residual amplitude error and $\Delta \theta i_k$ is the residual phase error, respectively. It also gives the attenuation that one can expect by using this technique. To reach good calibration result, a good accuracy is required for both the active leakage cancellation circuit and the crosstalk detector.

On the other hand, linearity of both the phase and the amplitude in the active leakage cancellation circuit versus the control signal is not required, a monotone relation will suffice, and thus becomes feasible for implementation. For example, the active leakage cancellation circuit may be implemented using a combination of a coarse control and a fine control.

As for robustness, the leakage to be cancelled can be assumed to be very stable as it largely depends on the geometry of the physical circuit structure. Additionally, the propagation delays of the parasitic coupling and the active leakage cancellation have the same direction, resulting in a common mode effect. This helps to reach a good accuracy. 40-60 dB attenuation can be expected from this cancellation method.

The power consumption introduced by the active leakage cancellation is very small because the leakage power is low and because the control loop can operate intermittently.

The crosstalk reduction technique presented herein exhibits various advantages. Firstly, the technique accommodates more challenging transceiver requirements, such as the ones defined in certain radio communication standards suggesting flexible carrier aggregation support, which requires a plurality of PLLs or COs on a same chip (or die). Secondly, according to the technique, the accuracy of the cancellation is based on crosstalk detection. As the error signal may be converted into a DC signal, the accuracy of the cancellation can achieve a high level. Thirdly, as the crosstalk has limited power, the cancellation circuitry can be designed in a low power style, and it may not need to operate continuously. Further, the crosstalk cancellation technique presented herein can achieve significant chip area reduction compared to transceiver designs based on PLL separation (physical separation of PLLs) only. Moreover, the crosstalk cancellation technique presented herein allows for more flexible floor-planning in transceiver design. Last but not least, the crosstalk cancellation technique presented herein incurs virtually no Q reduction penalty.

Those skilled in the art will appreciate that the crosstalk reduction technique explained herein may be implemented using hardware circuitry, software, or a combination thereof. The software may be operable in conjunction with a programmed microprocessor or a general purpose computer, using an Application Specific Integrated Circuit (ASIC) and/or Digital Signal Processor (DSPs). It will also be apparent that when the crosstalk reduction technique is described as a method, it may also be embodied in a computer processor and a memory coupled to the processor, wherein the memory is encoded with one or more programs that perform the method when executed by the processor.

While the crosstalk reduction technique has been described with reference to the above embodiments, it is to be understood that the description is for illustration purposes only. Accordingly, it is intended that the invention be limited only by the scope of the claims appended hereto.

The invention claimed is:

1. A radio communication device comprising a crosstalk detector for use in an arrangement for reducing crosstalk between a first controlled oscillator (CO1) and a second controlled oscillator (CO2), wherein the crosstalk detector is configured to detect a crosstalk signal generated by the first controlled oscillator to the second controlled oscillator, the crosstalk detector comprising:

means for producing a mixed signal (m1(t)) by mixing a clock signal (S1(t)) generated by the second controlled oscillator with a signal having a fixed relationship with the clock signal;

means for filtering the mixed signal (m1(t)) to produce a filtered signal;

an amplifier configured to receive the mixed signal (m1(t)) and to produce an amplified signal (a1(t));

means for converting the amplified signal (a1(t)) into a signal (m2(t)) which is an indication for the crosstalk signal.

2. The radio communication device of claim 1, wherein the means for producing the mixed signal comprises a limiter and a mixer; and the means for filtering comprises a band-pass filter.

3. The radio communication device of claim 1, wherein the means for converting the amplified signal (a1(t)) into the signal (m2(t)) comprises a rectifier that receives as input the amplified signal and outputs the signal (m2(t)).

4. The radio communication device of claim 3, further comprising filtering means for filtering the signal (m2(t)).

5. The radio communication device of claim 3, wherein the filtering means comprises a low-pass filter and an amplifier.

6. The radio communication device of claim 1, wherein the means for converting the amplified signal (a1(t)) into the signal (m2(t)) comprises:

a first quadrature mixer;
  a second quadrature mixer; and
  an adder for adding the outputs of the first and second quadrature mixers.

7. The radio communication device of claim 1, wherein the means for converting the amplified signal (a1(t)) into the signal (m2(t)) comprises:

a first quadrature mixer;
  a second quadrature mixer; and
  a multiplexor for multiplexing the outputs of the first and second quadrature mixers.

8. A radio communication device, comprising:

an integrated circuit having a first controlled oscillator and a second controlled oscillator; and an arrangement for reducing a crosstalk signal generated by the first controlled oscillator to the second controlled oscillator, the arrangement comprising:

a first crosstalk detector adapted to detect the crosstalk signal generated by the first controlled oscillator (CO) to the second controlled oscillator (CO);

a first crosstalk cancellation circuit adapted to generate a cancellation signal having an amplitude substantially the same as that of the crosstalk signal and a phase substantially opposite to that of the crosstalk signal; and a first cancellation signal injector adapted to introduce the cancellation signal into the second CO, wherein the first crosstalk detector comprises:

a mixer stage adapted to produce a mixed signal (m1(t)) by mixing a clock signal (S1(t)) generated by the second CO with a signal having a fixed relationship with the clock signal (S1(t)) generated by the second CO;

a filter adapted to filter the mixed signal (m1(t)) to produce a filtered signal;

a signal converter adapted to down-convert the filtered signal into a signal (m2(t)) which is an indication for the crosstalk signal.

* * * * *

UNITED STATES PATENT AND TRADEMARK OFFICE
CERTIFICATE OF CORRECTION

PATENT NO. : 10,484,214 B2  
APPLICATION NO. : 15/892002  
DATED : November 19, 2019  
INVENTOR(S) : Mu et al.

Page 1 of 1

It is certified that error appears in the above-identified patent and that said Letters Patent is hereby corrected as shown below:

In the Specification

In Column 9, Line 39, delete "$(C_i \cos(\alpha) + L_k \cos(\beta)0^2$" and insert -- $(C_i \cos(\alpha) + L_k \cos(\beta))^2$ --, therefor.

In Column 9, Line 41, delete "$2C_iL_k (\cos(\alpha-\beta)+2C_iL_k (\cos(\alpha+\beta)]$" and insert -- $2C_iL_k (\cos(\alpha-\beta))+2C_iL_k (\cos(\alpha+\beta))]$ --, therefor.

In Column 9, Line 43, delete "$0.5(C^2_i + L^2_k) + C_iL_k (\cos(\alpha-\beta)$" and insert -- $0.5(C^2_i + L^2_k) + C_iL_k (\cos(\alpha-\beta))$ --, therefor.

In Column 9, Line 44, delete "$0.5(C_i^2 \cos(2\alpha) + L_k^2\cos(2\beta) + 2C_iL_k (\cos(\alpha+\beta))$" and insert -- "$0.5(C_i^2\cos(2\alpha)) + L_k^2\cos(2\beta) + 2C_iL_k (\cos(\alpha+\beta))$ --, therefor.

Signed and Sealed this  
First Day of September, 2020

Andrei Iancu  
*Director of the United States Patent and Trademark Office*